United States Patent
Park et al.

(10) Patent No.: US 11,223,936 B2
(45) Date of Patent: Jan. 11, 2022

(54) IOT MANAGEMENT DEVICE FOR CARRYING OUT CONDITION MODIFICATION MODE AND METHOD FOR CONTROLLING SAME

(71) Applicant: LG ELECTRONICS INC., Seoul (KR)

(72) Inventors: Sihwa Park, Seoul (KR); Juhwan Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 344 days.

(21) Appl. No.: 15/527,549

(22) PCT Filed: Nov. 17, 2014

(86) PCT No.: PCT/KR2014/011003
§ 371 (c)(1),
(2) Date: May 17, 2017

(87) PCT Pub. No.: WO2016/080558
PCT Pub. Date: May 26, 2016

(65) Prior Publication Data
US 2017/0325047 A1 Nov. 9, 2017

(51) Int. Cl.
*H04W 4/00* (2018.01)
*H04L 29/08* (2006.01)
(Continued)

(52) U.S. Cl.
CPC ............ *H04W 4/70* (2018.02); *G06F 3/0482* (2013.01); *G06F 3/0488* (2013.01);
(Continued)

(58) Field of Classification Search
CPC . H04L 67/12; H04L 41/0813; H04L 67/2819; H04L 67/10; H04L 67/22;
(Continued)

(56) References Cited

U.S. PATENT DOCUMENTS 9,600,571 B2 * 3/2017 Shaashua ................ H04W 4/70
10,110,677 B2 * 10/2018 Karaoguz ............... H04L 67/22
(Continued)

FOREIGN PATENT DOCUMENTS

KR 1020090092699 9/2009
KR 1020130068640 6/2013
(Continued)

OTHER PUBLICATIONS

PCT International Application No. PCT/KR2014/011003, Written Opinion of the International Searching Authority dated Aug. 13, 2015, 27 pages. Korean Intellectual Property Office Application No. 10-2017-7008156, Office Action dated Jul. 9, 2020, 6 pages.

*Primary Examiner* — Philip J Chea
*Assistant Examiner* — Ruth Solomon
(74) *Attorney, Agent, or Firm* — Lee, Hong, Degerman, Kang & Waimey PC

(57) ABSTRACT

The present description relates to an IoT management device for carrying out a condition modification mode and a method for controlling same, the IoT management device which can modify a preset condition by means of a reference to data related to the IoT device. An IoT management device, according to the present description, comprises a communication unit for transmitting and receiving data to and from one or more sub-IoT devices (hereinafter, referred to as "sub-devices") connected to a communication network; and a control unit for receiving from the communication unit data, which comprises time information and is related to the usage or state of the sub-devices, and for performing a preset operation when in a condition (hereinafter, referred to as "a point of condition satisfaction") in which data (hereinafter, referred to as "first data"), connected to a preset condition, among the data satisfies the condition, wherein the control unit can carry out a condition modification mode for asking (Continued)

a user whether or not the condition is to be modified into a condition to which added is data (hereinafter, referred to as "second data") not connected to the condition among data having time information before the point of condition satisfaction.

18 Claims, 10 Drawing Sheets

(51) Int. Cl.
  *G06F 3/0482* (2013.01)
  *H04W 4/70* (2018.01)
  *G06F 3/0488* (2013.01)
  *H04L 12/28* (2006.01)
(52) U.S. Cl.
  CPC ........ *H04L 12/282* (2013.01); *H04L 12/2823* (2013.01); *H04L 67/12* (2013.01)
(58) Field of Classification Search
  CPC ... H04L 12/2809; H04L 41/06; H04L 41/069; H04L 47/20; H04L 41/22; H04L 12/282; H04L 12/2823; G06F 1/3206; G06F 9/542; G06F 3/0482; G06F 3/0488; H04W 4/70; H04W 4/02; H04W 4/38; H04W 4/50; H04W 4/80; H04W 84/18
  See application file for complete search history.

(56) References Cited

U.S. PATENT DOCUMENTS

| | | | | |
|---|---|---|---|---|
| 2014/0062712 | A1* | 3/2014 | Reiter | G08B 5/22 340/691.6 |
| 2014/0244710 | A1* | 8/2014 | Sharma | H04L 67/12 709/201 |
| 2014/0337528 | A1* | 11/2014 | Barton | H04L 41/00 709/225 |
| 2014/0351800 | A1* | 11/2014 | Jao | G06F 8/41 717/140 |
| 2015/0019710 | A1* | 1/2015 | Shaashua | H04W 4/70 709/224 |
| 2015/0081210 | A1* | 3/2015 | Yeh | G16H 40/67 701/428 |
| 2015/0113059 | A1* | 4/2015 | Lyons | H04L 12/1813 709/204 |
| 2015/0164390 | A1* | 6/2015 | Larvenz | A61B 5/14532 600/365 |
| 2015/0324698 | A1* | 11/2015 | Karaoguz | H04L 67/22 706/46 |
| 2016/0343225 | A1* | 11/2016 | Lee | G08B 25/10 |

FOREIGN PATENT DOCUMENTS

| | | |
|---|---|---|
| KR | 1020140039961 | 4/2014 |
| KR | 1020140042578 | 4/2014 |
| KR | 1020140063693 | 5/2014 |
| WO | 2009099880 | 8/2009 |

* cited by examiner

IOT MANAGEMENT DEVICE FOR CARRYING OUT CONDITION MODIFICATION MODE AND METHOD FOR CONTROLLING SAME

CROSS-REFERENCE TO RELATED APPLICATIONS

This application is the National Stage filing under 35 U.S.C. 371 of International Application No. PCT/KR2014/011003, filed on Nov. 17, 2014, the contents of which are all hereby incorporated by reference herein in its entirety.

TECHNICAL FIELD

The present specification relates to an IoT management device that may manage an IoT device, and more particularly, to an IoT management device for carrying out a condition modification mode, which may modify a predetermined condition with reference to data related to an IoT device, and a method for controlling the same.

BACKGROUND ART

Recently, IoT (Internet of Things) technology has received attention in accordance with the development of a mobile digital device and the development of communication technologies. The IoT technology means that things mutually transmit and receive data through Internet. However, in addition to simple data transmission between things, the IoT technology provides users with information required for the users or assists users through data helpful for favorable selection of the users to allow the users to enjoy better life.

As one of technologies that may be used most widely in such an IoT environment, there may be IFTTT. IFTTT means that a predetermined next operation is performed when a predetermined specific condition is satisfied. For example, when indoor humidity measured by a hygrometer exceeds 80%, a humidifier is actuated. At this time, the hygrometer transmits indoor humidity related data measured by its sensor through Internet, and the humidifier that has received the data performs a humidifying operation. Data may simply be transmitted and received between two IoT devices like the above example, and data may also be transmitted to and received from an IoT management device that may manage a plurality of IoT devices.

Meanwhile, if a plurality of IoT devices exist, a user may feel that a condition should be modified at the time when the condition is satisfied. Particularly, the user may not recognize that his/her behavior or surrounding environment has affected him/her prior to the time when the condition is satisfied. For example, it is assumed that a user sets a blood pressure measuring device and a smart phone to generate an alarm when a blood pressure is 160 mmHG or more. At this time, the user may desire to know what behavior or environment has affected his/her blood pressure prior to the time when his/her blood is measured at a high value. Also, the user may desire to know that a recently added IoT device has affected his/her condition.

As described above, it is required to modify the condition by receiving data from the IoT device operated prior to the time when the condition is satisfied.

DISCLOSURE

Technical Problem

An object of the present specification devised to solve the problem of the related art is to provide an IoT management device for carrying out a condition modification mode and a method for controlling the same.

Technical Solution

To achieve the above object, an IoT management device according to the present specification comprises a communication module for transmitting and receiving data to and from at least one or more sub-IoT devices (hereinafter, referred to as "sub-devices") connected to a communication network; and a controller for receiving, from the communication module, data including time information, related to usage or state of the sub-devices, and for performing a predetermined operation when data (hereinafter, referred to as "first data") associated with the predetermined condition, among the data, satisfies the condition (hereinafter, referred to as 'condition satisfaction timing'), wherein the controller carries out a condition modification mode for asking a user whether to modify the condition to a condition to which data (hereinafter, referred to as "second data") not associated with the condition among data having time information prior to the condition satisfaction timing is added.

According to one embodiment of the present specification, the controller may carry out the condition modification mode by using data having time information close to the condition satisfaction timing among the second data.

Meanwhile, when the condition satisfaction timing is a condition satisfaction timing of N times (N is a natural number of 2 or more) and a condition satisfaction timing occurring just before the condition satisfaction timing of N times is a condition satisfaction timing of N−1 times, the controller may carry out the condition modification mode by using data having time information between the condition satisfaction timing of N−1 times and the condition satisfaction timing of N times among the second data.

According to another embodiment of the present specification, the controller may carry out the condition modification mode by using highly frequent data among the second data.

According to still another embodiment of the present specification, the controller may carry out the condition modification mode by using data generated from a sub-device, which is added to the communication network most recently, among the second data. In this case, the IoT management device further comprises a memory for storing a list of sub-devices connected to the communication network, wherein the controller may determine a sub-device, which is added to the communication network most recently, by using the list of sub-devices stored in the memory.

According to one embodiment of the present specification, the controller may carry out an input value modification mode for asking the user whether to modify a value of the second data, which will be added, when the condition is modified to a condition, to which the second data is added, by an input of the user.

According to one embodiment of the present specification, the controller may exclude data set so as not to be added to the condition by the user among the second data from the condition modification mode.

According to one embodiment of the present specification, the controller may request the sub-device to transmit the second data through the communication module at the condition satisfaction timing, and may carry out the condition modification mode by receiving the second data from the communication module.

The IoT management device according to the present specification may further comprise a memory for storing the data received through the communication module. According to another embodiment of the present specification, the controller may carry out the condition modification mode by selecting the second data from the data stored in the memory at the condition satisfaction timing.

The IoT management device according to the present specification may further comprise a display module for displaying a screen through a control signal of the controller. The controller may output the control signal to display an interface for modification of the condition, the condition and the second data on the display module in the condition modification mode.

According to one embodiment of the present specification, the controller may output the control signal to firstly display data having timing information close to the condition satisfaction timing when displaying the second data.

According to another embodiment of the present specification, the controller may output the control signal to firstly display data generated from a sub-device, which is added to the communication network most recently, when displaying the second data.

According to still another embodiment of the present specification, the controller may output the control signal to first display highly frequent data among the second data when displaying the second data.

According to one embodiment of the present specification, when an input of the user is received to modify the condition to a condition, to which the second data is added, in the condition modification mode, the controller may output the control signal to display an interface for modification of the added value of the second data.

According to one embodiment of the present specification, when the condition is modified to a condition, to which at least one or more data of the second data are added, by an input of the user, the controller may output the control signal to display the modified condition.

According to one embodiment of the present specification, when an input of the user is received so as not to add a list of data set so as not to be added to the condition among the second data to the condition in the condition modification mode, the controller may output the control signal to display the list of data set so as not to be added to the condition.

According to one embodiment of the present specification, the controller may output the control signal to allow a sub-device, which includes a display module, among the sub-devices, to display a screen related to the condition modification mode.

To achieve the above object, a method for controlling an IoT management device according to the present specification comprises the steps of (a) receiving data including time information, related to the usage or state of at least one or more sub IoT devices (hereinafter, referred to as 'sub-devices') connected to a communication network, from a communication module for transmitting and receiving data to and from the sub-devices; (b) determining whether data (hereinafter, referred to as 'first data') associated with a predetermined condition among the data satisfies the condition; and (c) when the first data satisfies the condition (hereinafter, referred to as 'condition satisfaction timing'), carrying out a condition modification mode for asking a user whether to modify the condition to a condition to which data (hereinafter, referred to as "second data") not associated with the condition among data having time information prior to the condition satisfaction timing is added.

According to one embodiment of the present specification, the step (c) may include further performing a predetermined operation at the condition satisfaction timing.

Advantageous Effects

According to one aspect of the present specification, through second data having time information prior to the condition satisfaction time, a user may identify data related to the condition and determine correlation with the condition. Moreover, the condition may exactly be modified to be close to the user's intention, whereby the user's intention may be reflected more exactly.

According to another aspect of the present specification, it is possible to determine whether a newly added sub-device affects the condition.

BRIEF DESCRIPTION OF THE DRAWINGS

The accompanying drawings, which are included to provide a further understanding of the present specification, illustrate preferred embodiments of the present specification and together with the description serve to explain the technical spirits of the present specification, and thus the present specification should not be construed to be limited to the drawings.

BEST MODE FOR CARRYING OUT THE INVENTION

Hereinafter, the embodiments of the present specification will be described in detail with reference to the accompanying drawings. At this time, although the embodiments of the present specification will be described in detail with reference to the accompanying drawings and the disclosure described by the drawings, it is to be understood that the technical spirits and principles of the present specification are not limited by such embodiments.

Figure 1:
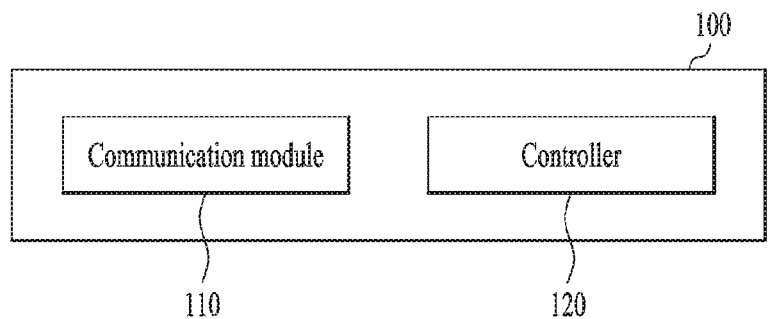
FIG. 1 is a block diagram briefly illustrating a configuration of an IoT management device according to one embodiment of the present specification.

FIG. 1 is a block diagram briefly illustrating a configuration of an IoT management device according to one embodiment of the present specification.

Referring to FIG. 1, the IoT management device 100 (hereinafter, referred to as 'management device') according to the present specification includes a communication module 110 and a controller 120.

The communication module 110 may transmit and receive data to and from at least one or more sub-IoT devices connected to a communication network.

The controller 120 may receive data including time information, related to usage or state of the sub-device from the communication module 110. The controller 120 may perform a predetermined operation when data (hereinafter, referred to as 'first data') associated with a predetermined condition among the above data satisfies the condition (hereinafter, referred to as 'condition satisfaction timing'). The controller 120 may carry out a condition modification mode for asking a user whether to modify the condition to a condition to which data (hereinafter, referred to as 'second data') not associated with the condition among data having time information prior to the condition satisfying time is added.

Figure 2:
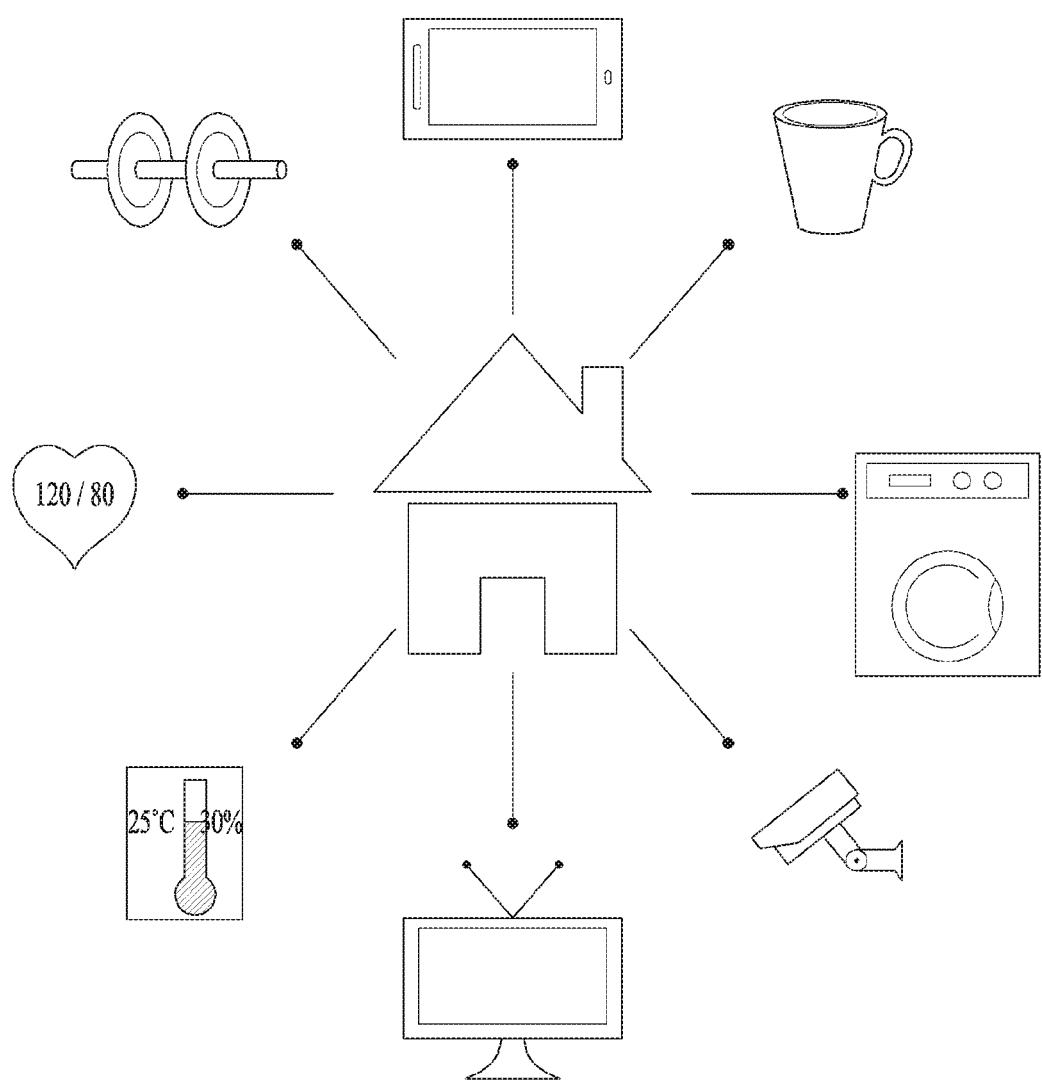
FIG. 2 is an exemplary view briefly illustrating a plurality of sub-devices connected to a communication network in accordance with one embodiment of the present specification.

FIG. 2 is an exemplary view briefly illustrating a plurality of sub-devices connected to a communication network in accordance with one embodiment of the present specification.

Referring to FIG. 2, it is noted that a smart phone, a coffee cup, a washing machine, a CCTV, a TV, a thermos-hygrometer, a blood pressure measurer, and a dumbbell are shown as the plurality of sub-devices (clockwise description). Each of the devices includes a communication module, and may be connected to a communication network through the communication module. That is, the devices correspond to the IoT device. In the example shown in FIG. 2, the IoT devices are connected to the communication network through a communication network for home use. However, the communication network may be a communication network installed in various environments such as companies, public places, offices, and business offices. The IoT devices may transmit data related to their usage or state through the communication network. At this time, the data may include time information, which includes usage time of the device, a time value measured through a sensor included in the device, time related to the state of the device, etc.

The data transmitted from the IoT devices are received by the management device 100 according to the present invention, which manages the devices. Therefore, the IoT devices are managed by the management device 100 according to the present invention. Hereinafter, the IoT devices will be referred to as 'sub-devices' in this specification.

According to one embodiment of the present specification, the management device 100 may be a separate device physically identified from the sub-devices. For example, the management device 100 may be a device configured together with a server that manages and controls the communication network, or may be a device included in the server. In this case, the controller 120 may output a control signal to allow the sub-device, which includes a display module, to display a screen related to the condition modification mode.

According to another embodiment of the present specification, any one of the sub-devices may be the management device 100 according to the present specification. In this case, the management device 100 is also an IoT device, and may transmit data related to usage or state of the device to the communication network and receive data related to usage or state of another sub-device from another sub-device. Hereinafter, in this specification, the smart phone shown in FIG. 2 is the management device 100 according to the present specification. However, the management device 100 according to the present specification is not limited to the smart phone.

Figure 3:
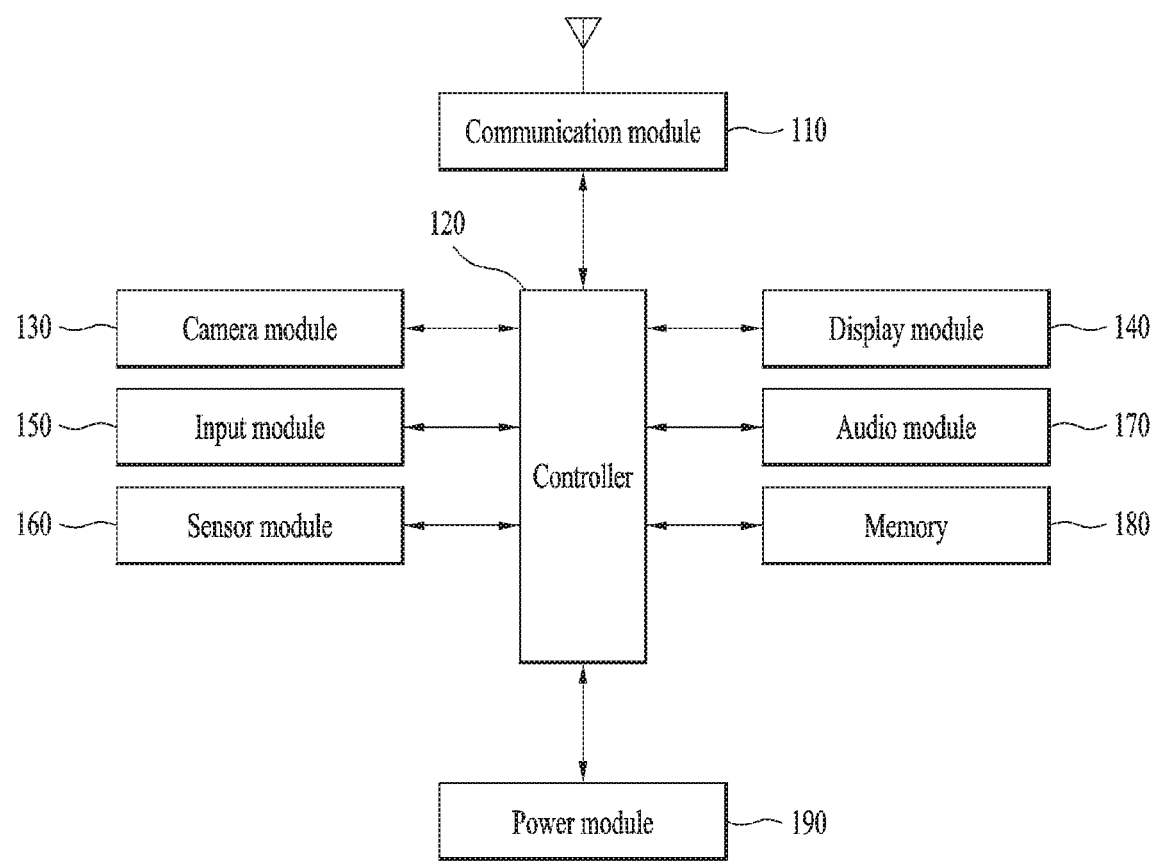
FIG. 3 is a block diagram briefly illustrating a configuration of an IoT management device according to another embodiment of the present specification.

FIG. 3 is a block diagram briefly illustrating a configuration of an IoT management device according to another embodiment of the present specification.

Referring to FIG. 3, the management device 100 according to the present specification may further include any one or more of a camera module 130, an input module 150, a sensor module 160, a display module 140, an audio module 170, a memory 180, and a power module 190 in addition to the communication module 110 and the controller 120.

The controller 120 may execute contents stored in the memory 180 or contents received through data communication in addition to the aforementioned control logic described with reference to FIG. 1. Also, the controller 120 may execute various applications and process data inside the management device 100. Also, the controller 120 may control the aforementioned respective components of the management device 100 and control data transmission and reception between the respective components. The controller 120 may include a processor, ASIC (application-specific integrated circuit), different chip sets, a logic circuit, a register, a communication modem, a data processing device, etc., which are known in the art to which the present invention pertains, to execute various control logics which will be described in detail. Also, when the aforementioned control logic is implemented as software, the controller 120 may be implemented as a set of program modules. At this time, the program modules may be stored in the memory 180 and executed by the processor.

The communication module 110 may perform communication and transmit and receive data using various protocols. The various protocols may be wire or wireless communication protocols. In case of wire communication, the communication module 110 may include various input and output interfaces (not shown) that enable wire data transmission communication with the sub-device. For example, examples of the interfaces may include USB (Universal Serial Bus) specifications, HDMI (High Definition Multimedia Interface), DVI (Digital Visual Interface), IEEE 1394 specifications, or interfaces considering data transmission according to other similar specifications related to data transmission. In case of wireless communication, the communication module 110 may include RF electric circuit network considering wireless communication to a communication network such as Internet, LAN (Local Area Network), and WAN (Wide Area Network). For the wireless communication network connected by the communication module 110, GSM (Global System for Mobile Communications), EDGE (Enhanced Data GSM Environment, CDMA (Code Division Multiple Access), W-CDMA (Wideband Code Division Multiple Access), TDMA (Time Division Multiple Access), Wibro, mobile communication mode such as HSPA (High Speed Packet Access), HSDPA (High Speed Downlink Packet Access) and LTE (Long Term Evolution), or short-range communication mode interface such as Bluetooth, RFID (Radio Frequency Identification), infrared communication (IrDA, infrared Data Association), UWB (Ultra Wideband), ZigBee, and WLAN (Wireless LAN) (Wi-Fi) may be supported. In this case, the wire/wireless interface modes are examples for assisting understanding of the present specification, and since the interface mode for transmitting and receiving information may be modified easily by those skilled in the art, the interface mode in this specification will not be limited to the aforementioned examples.

The camera module 130 takes an image of a surrounding environment of the management device 100 and converts the image into an electric signal. To this end, the camera module 130 may include an image sensor that may convert an optical signal into an electric signal. The image taken by the camera module 130 and converted into the electric signal may be stored in the memory 180 and then output to the controller 120, or may be output to the controller 120 without being stored. Also, the image taken by the camera module 130 may be a still image or moving image. The camera module 130 may be used as a motion sensor or a video sensor. The camera module 130 may include a plurality of cameras if necessary.

The input module 150 may externally receive a user input. The input module 150 may be implemented in various manners. For example, the input module 150 may be implemented as a keyboard, a keypad, a mouse, a touch pad, a button, a soft key, etc. In a broad sense, the input module 150 may include a microphone, a touch screen, etc. The microphone may receive a user's voice, and the touch screen may receive a touch gesture of the user. As the case may be, the microphone may be included in the audio module 170, and the touch screen may be included in the display module 140.

The sensor module 160 may detect a surrounding environment of the management device 100 by using at least one sensor provided in the management device 100 and transfer the detected result to the controller 120. Also, the sensor module 160 may sense a user input and transfer the sensed user input to the controller 120. At this time, the sensor module 160 may include at least one sensing means. For example, the sensing means may include various sensing means such as a gravity sensor, a terrestrial magnetism sensor, a motion sensor, a gyro sensor, an acceleration sensor, an infrared sensor, an inclination sensor, a brightness sensor, an altitude sensor, a smell sensor, a temperature sensor, a depth sensor, a pressure sensor, a bending sensor, an audio sensor, a video sensor, a GPS (Global Positioning System) sensor, a touch sensor, and a fingerprint sensor. The sensor module 160 refers to the aforementioned various sensing means, and may sense various inputs of the user and the user's environment and transfer the sensed result to the controller 120 to allow the controller 120 to perform the operation according to sensed result. The aforementioned sensing means may be included in the management device 100 as separate elements or may be included in the management device by being incorporated as at least one or more elements.

The display module 140 may output an image on a display screen. The display module 140 may output the image on the basis of contents or control command executed in the controller 120.

Meanwhile, according to the embodiment of the present specification, the management device 100 may include the sensor module 160 on the display module 140. Therefore, the management device 100 may detect various user inputs performed on the display module 140 through the sensor module 160. For example, if the sensor module 160 includes a touch sensor, the management device 100 may receive the user's various touch inputs performed on the display module 140. Also, if the sensor module 160 includes a fingerprint sensor, the management device 100 may collect fingerprint information of a corresponding user from the user input performed on the display module 140. In this way, the management device 100 in this specification may include a screen sensor that constitutes a mutual layer structure of the display module 140 and the sensor module 160.

The audio module 170 may include an audio output means such as a speaker and an audio input means such as a microphone. The audio output means may output an audio signal of contents executed in the management device 100. The contents may be provided from the memory 180, or may be provided from the sub-device through the communication module 110. The output means may include at least one of an air conduction speaker and a bone conduction speaker.

The memory 180 may store various digital data such as video, audio, photo, and application. The application may be a program for the operation of the controller 120. Also, the video or photo may be data acquired through the camera module 130. The memory 180 may include RAM (Random Access Memory), SRAM (Static Random Access Memory), ROM (Read Only Memory), EEPROM (Electrically Erasable Programmable Read Only Memory), and PROM (Programmable Read Only Memory). Also, the memory 180 may be operated in relation to a web storage on Internet to perform the storage function. Also, the memory 180 may further include an external storage medium detachably provided in the management device 100. The external storage medium may include a slot type such as SD (Secure Digital) memory or CF (Compact Flash) memory, a memory stick type, and a USB (Universal Serial Bus) type. That is, any storage medium that may be detachably provided in the management device 100 and may provide contents such as audio, photo, moving image and application to the management device 100 may be used as the external storage medium. For example, the memory 180 may include a RAM, a ROM, a cache memory, a hard disk drive (HDD), a solid state drive (SSD), a CD, a DVD, a Blu-ray disk, a floppy disk (FDD), a magnetic disk, a memory card, a flash memory, and a USB memory.

The power module 190 is a power source connected with a battery or an external power source, and may supply a power to the device. The battery includes a secondary battery as well as a primary battery. The secondary battery may include a rechargeable lithium ion battery, a lithium polymer battery, a nickel-cadmium battery, a nickel-hydride battery, and nickel-zinc battery.

The management device 100 according to the present specification may manage a list of the sub-devices connected to the communication network.

Figure 4:
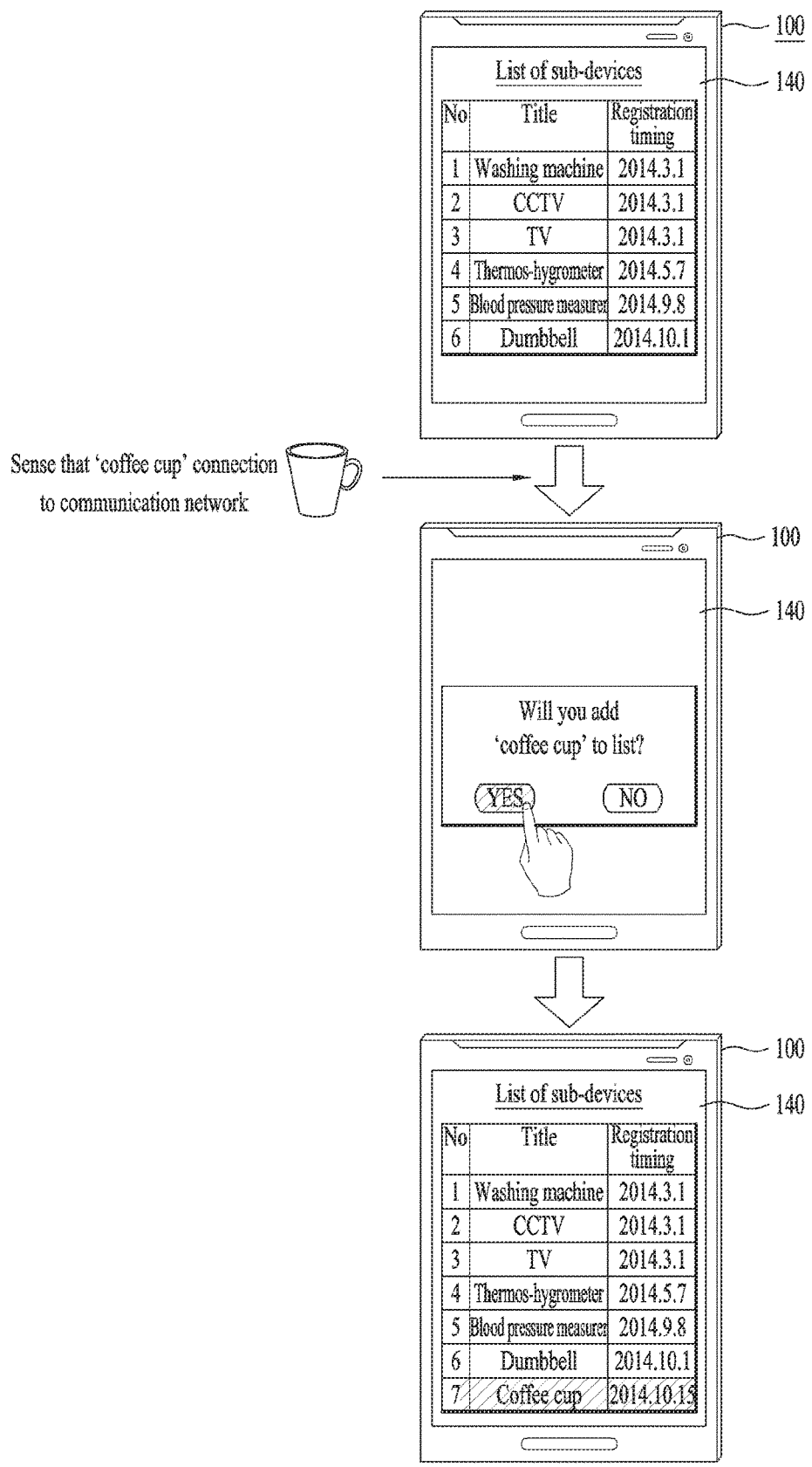
FIG. 4 is an exemplary view illustrating an exemplary status that a management device according to the present specification manages a list of sub-devices connected through a communication network.

FIG. 4 is an exemplary view illustrating an exemplary status that a management device according to the present specification manages a list of sub-devices connected through a communication network.

The exemplary status shown in FIG. 4 is that a new sub-device, that is, 'coffee cup' is connected to the communication network. The management device 100 according to the present specification may sense whether the legacy sub-device is still connected to the communication network and a new sub-device has been connected to the communication network, by monitoring the communication network. Referring to FIG. 4, it is noted that 'the list of sub-devices' is displayed on an upper stage of the display module 140 of the management device 100. The list of sub-devices may be stored in the memory 180. If it is sensed that a new sub-device is connected to the communication network, the management device 100 may display a graphic interface on the display module 140 to ask a user whether to add the new sub-device to the list of the sub-devices (see middle stage of FIG. 4). If the user inputs the new sub-device through the graphic interface to add the new sub-device to the list of sub-devices through the graphic interface, the management device 100 adds the new sub-device to the list of sub-devices (see lower stage of FIG. 4). Afterwards, the new sub-device will transmit data related to its usage or state through the communication network, and the management device 100 will receive the data through the communication module 110.

Figure 5:
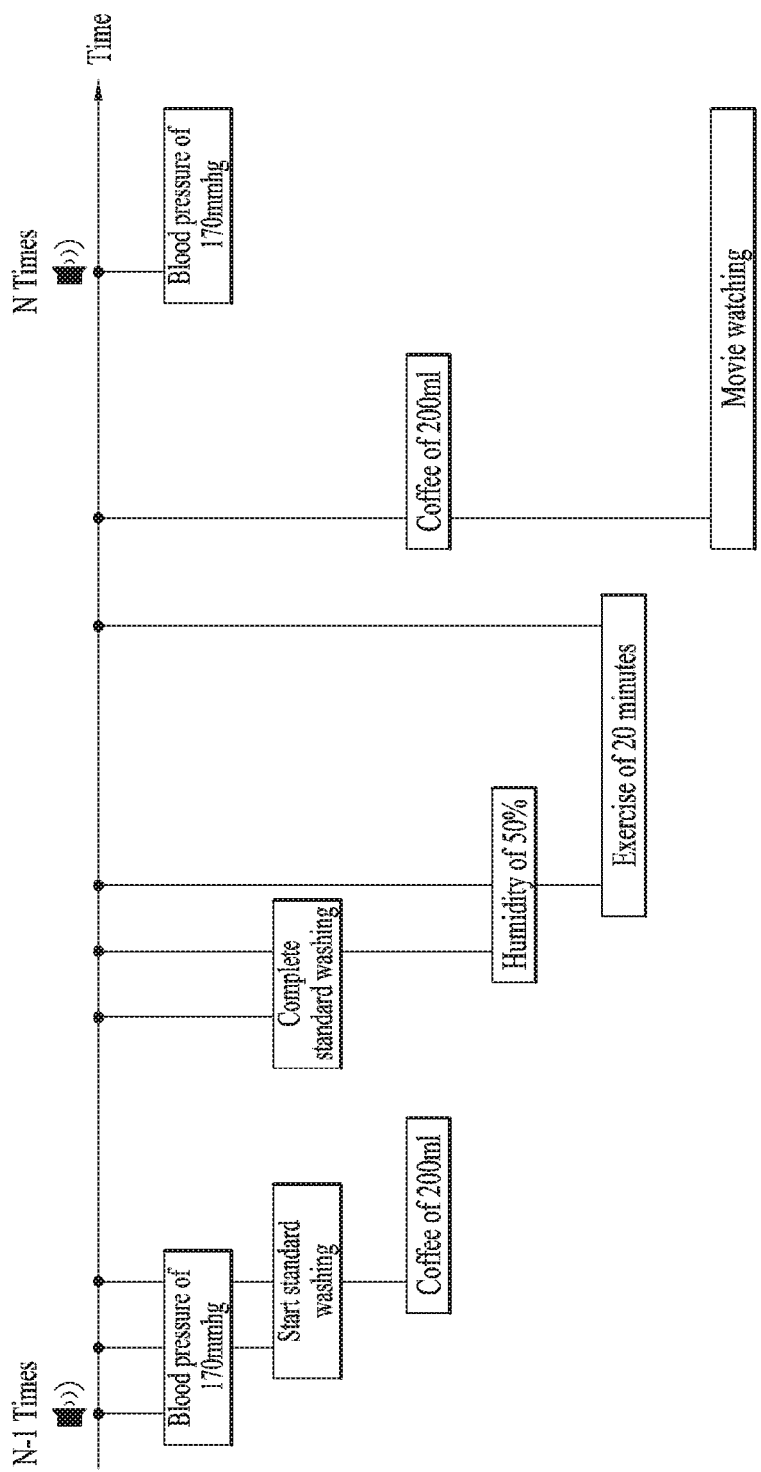
FIG. 5 is an exemplary view illustrating that a controller according to the present specification receives data from a sub-device depending on time.

FIG. 5 is an exemplary view illustrating that a controller according to the present specification receives data from a sub-device depending on time.

Referring to FIG. 5, it is noted that a time axis is shown. The time axis represents that time flows from the left to the right. Data received from the sub-device are briefly shown in FIG. 5. First of all, data indicating 'blood pressure value of 170 mmHg' is received from a blood pressure measurer of the sub-device. And then, data indicating 'start of standard washing' from a washing machine, data indicating drinking of 'coffee of 200 ml' from a coffee cup, data indicating 'complete standard washing' from the washing machine, data indicating 'current humidity of 50%' from a thermo-hygrometer, data indicating 'exercise time of 20 minutes' from a dumbbell, data indicating drinking of 'coffee of 200 ml' from the coffee cup, data indicating 'movie watching' from a TV, and data indicating 'blood pressure value of 170 mmHg' are received in due order. In this way, the controller 120 may receive data including time information, related to usage or state of the sub-device from the communication module 110.

At this time, the controller 120 may perform a predetermined operation when data (hereinafter, referred to as 'first data') associated with a predetermined condition among the above data satisfies the condition (hereinafter, referred to as 'condition satisfaction timing'). For example, it is assumed that information indicating that 'an alarm sound is generated when a blood pressure value measured from a blood pressure measurer is 160 mmHg or more' is set in the management device 100. At this time, 'the predetermined condition' is that 'a blood pressure value measured from a blood pressure measurer is 160 mmHg or more'. The data associated with the condition, that is, the first data are received from the blood pressure measurer of the sub-devices. The 'predetermined operation' corresponds to 'generation of an alarm sound'. In the example shown in FIG. 5, the controller 120 determines that the condition is satisfied as the blood pressure value measured from the blood pressure measurer is 170 mmHg. Therefore, the controller 120 has performed the operation for generating the alarm sound. Simply, the controller 120 may perform an 'IFTTT (IF This Then That)' operation.

However, the role of the controller 120 is not limited to IFTTT. The controller 120 according to the present specification may carry out a condition modification mode for asking a user whether to modify the condition to a condition to which data (hereinafter, referred to as 'second data') not associated with the condition among data having time information prior to the condition satisfying time is added. Hereinafter, the condition modification mode will be described in more detail. However, for convenience of understanding, an exemplary status will be assumed.

As an exemplary status for convenience of understanding, the user desires to a cause of his/her blood pressure increase. To this end, the user sets that 'a blood pressure value measured from a blood pressure measurer is 160 mmHg or more', as a 'condition'. When the condition is satisfied, the user sets an operation for 'generation of an alarm sound'. Therefore, the controller 120 performs a control operation to generate an 'alarm sound' because the data received from the blood pressure measurer satisfies the condition. At this time, the controller 120 may perform the condition modification mode after the condition satisfaction timing.

FIGS. 6 to 10 are exemplary views illustrating a condition modification mode according to the present specification.

Figure 6:
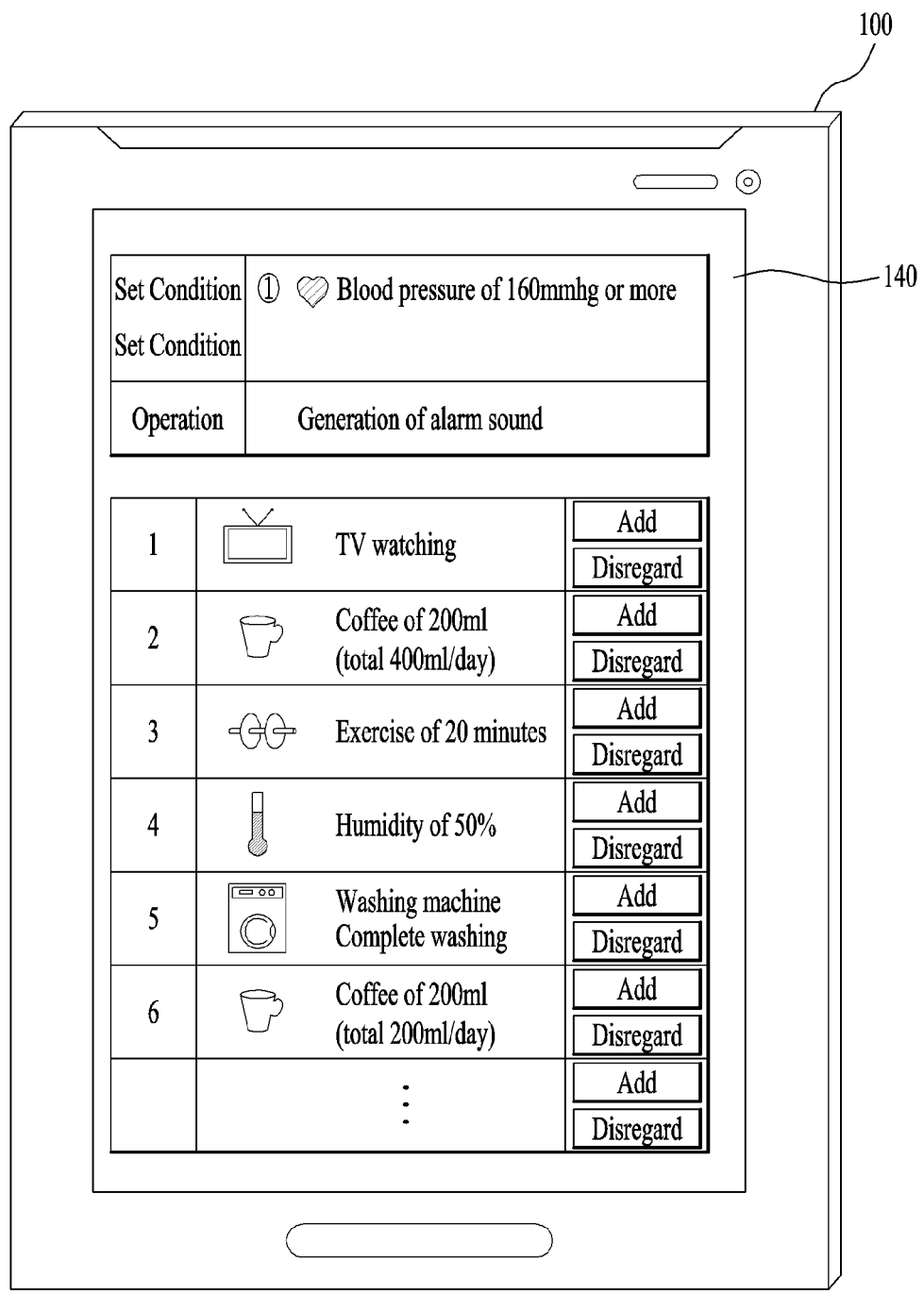
FIGS. 6 to 10 are exemplary views illustrating a condition modification mode according to the present specification.
Figure 7:
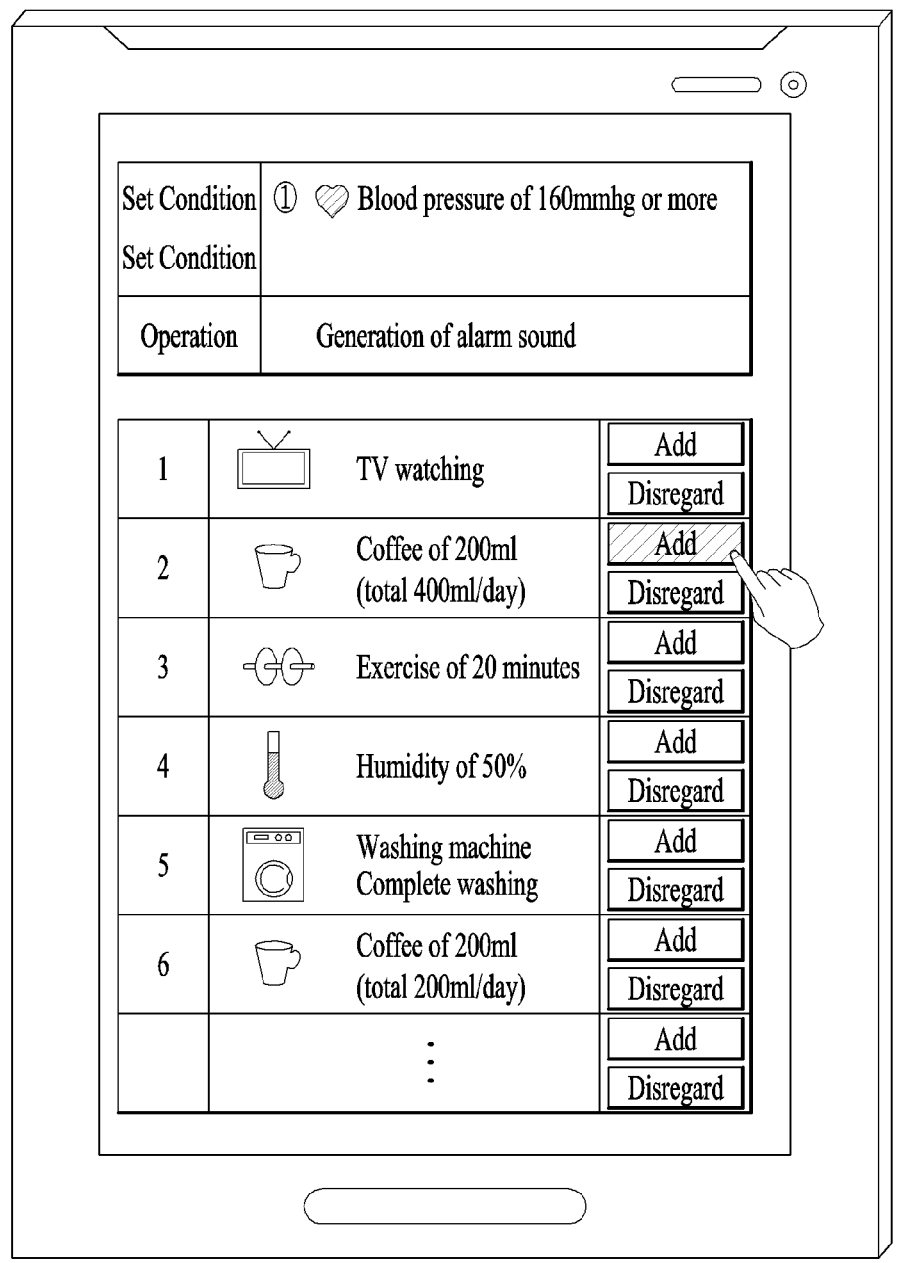

First of all, referring to FIG. 6, it is noted that the condition modification mode is displayed on the display module 140. If the management device 100 includes the display module 140 in accordance with one embodiment of the present specification, the controller 120 may output a control signal to display an interface for the condition, the second data and the condition modification on the display module 140 in the condition modification mode. Therefore, through the contents displayed on the display module 140, the user may identify that the currently set condition is that 'a blood pressure value measured from a blood pressure measurer is 160 mmHg or more' and 'generation of an alarm sound' is performed at the condition satisfaction timing.

Also, the user may identify data which are not associated with the condition among data having time information prior to the condition satisfying time, through the second data displayed on the display module 140. The second data mean the other data except the data (the first data) related to the current condition among the data received from the sub-device. That is, the second data mean the data received from the other sub-devices except the data received from the blood pressure measurer. The second data mean data having time information prior to the condition satisfaction timing among the data received from the sub-devices. That is, only data received from the washing machine, the coffee cup, the thermo-hygrometer, the dumbbell, and the TV, having time information prior to the condition satisfaction timing correspond to the second data (see FIG. 5). The user may determine his/her conscious or unconscious behavior or an environment or state that affects the user, through the second data prior to the condition satisfaction timing.

Meanwhile, there may be various methods for collecting the second data for carrying out the condition modification mode in the controller 120. According to one embodiment of the present specification, the controller 120 may request the sub-device to transmit the second data at the condition satisfaction timing through the communication module, and may carry out the condition modification mode by receiving the second data from the communication module 110. According to another embodiment of the present specification, the controller 120 may carry out the condition modification mode by selecting the second data from the data stored in the memory 180 at the condition satisfaction timing.

Also, there may be various methods for selecting the second data for carrying out the condition modification mode in the controller 120.

According to one embodiment of the present specification, the controller 120 may carry out the condition modification mode by using data having time information close to the condition satisfaction timing among the second data. This is because that correlation of the second data with the condition may be lowered if the second data are in time far away from the condition satisfaction timing. If the management device 100 includes the display module 140, the controller 120 may output the control signal to firstly display data having time information close to the condition satisfaction timing on the display module 140 when the second data are displayed on the display module 140.

Meanwhile, the condition satisfaction timing may occur N times or more (N is a natural number of 2 or greater). That is, the case that a blood pressure value measured from the blood pressure measurer is 160 mmHg or more may occur twice or more. Therefore, the condition satisfaction timing may be referred to as condition satisfaction timing of N times, and the condition satisfaction timing occurring just before the condition satisfaction timing of N times may be referred to as condition satisfaction timing of N−1 times. According to another embodiment of the present specification, the controller 120 may carry out the condition modification mode by using data having time information between the condition satisfaction timing of N−1 times and the condition satisfaction timing of N times among the second data. In other words, the controller 120 carries out the condition modification mode by using the second data from the timing (N−1 times) just before the condition satisfaction timing to the last timing (N times) of the condition satisfaction timing.

According to still another embodiment of the present specification, the controller 120 may carry out the condition modification mode by using data generated from the sub-device, which is added to the communication network most recently, among the second data. In this case, the controller 120 may determine the sub-device, which is added to the communication network most recently, by using the list of sub-devices stored in the memory 180. If the management device 100 includes the display module 140, the controller 120 may output the control signal to first display the data generated from the sub-device, which is added to the communication network most recently, on the display module 140 when displaying the second data on the display module 140.

According to further still another embodiment of the present specification, the controller 120 may carry out the condition modification mode by using highly frequent data among the second data. If the management device 100 includes the display module 140, the controller 120 may output the control signal to first display the highly frequent data among the second data on display module 140 when displaying the second data on the display module 140.

As described above, the controller 120 may output the control signal to display an interface for the condition modification on the display module 140. In FIG. 6, a button type interface displayed as 'add' and 'disregard' corresponds to the interface for the condition modification. The user desires to modify the condition to a condition to which coffee is added, by thinking that one of causes for increasing his/her blood pressure among the second data is coffee. Therefore, referring to FIG. 7, the user touches an 'add' interface of the second data corresponding to coffee. In this case, when the condition is modified to the condition to which the second data is added by the user's input, the controller 120 may carry out an 'input value modification mode' for asking the user whether to modify the value of the second data which will be added. If the management device 100 includes the display module 140, the controller 120 may output the control signal to display an interface, which may modify the added value of the second data, on the display module 140 when the user's input is received to modify the condition to a condition to which the second data is added in the condition modification mode.

Figure 8:
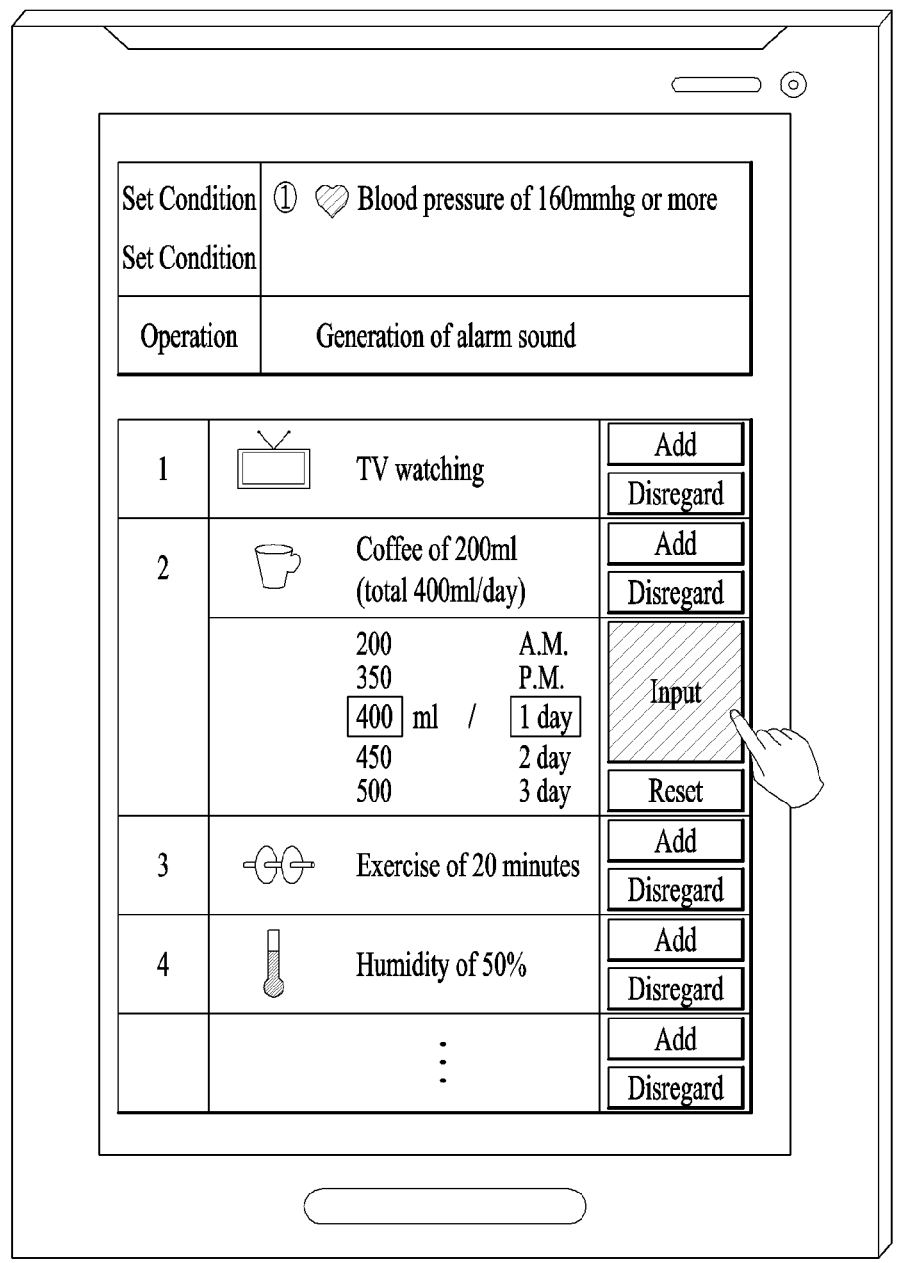

Referring to FIG. 8, it is noted that an exemplary interface, which may modify the added value of the second data, is displayed on the display module 140. The status shown in FIG. 8 is that the user inputs the case that the daily drinking amount of coffee through the coffee cup of the sub-device is 400 ml or more, to add the corresponding case to the condition.

Figure 9:
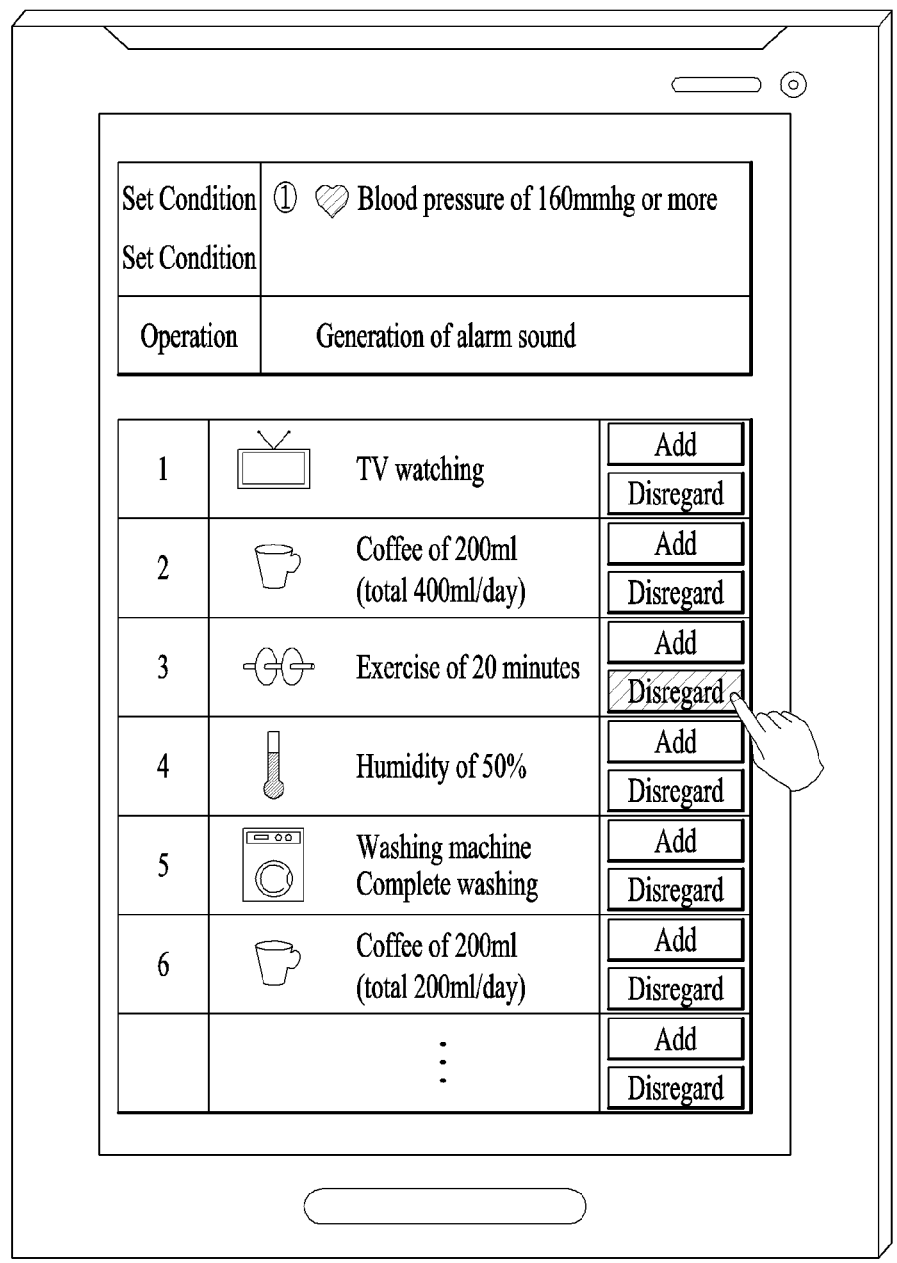

If the management device 100 includes the display module 140 in accordance with one embodiment of the present invention, when the condition is modified to a condition to which at least one or more data of the second data are added, the controller 120 may output the control signal to display the modified condition on the display module 140. Referring to FIG. 9, it is noted that the condition of 'coffee of 400 ml or more' is added to a portion where the condition is displayed. The added condition may be a logic 'AND' relation or logic 'OR' relation with the existing condition 'blood pressure of 160 mmHg'. In this specification, it is assumed that the added condition is a logic 'AND' relation with the existing condition. Therefore, the modified condition is 'blood pressure of 160 mmHg or more' and 'coffee of 400 ml or more'. As a result, if an alarm sound is generated as the modified condition is satisfied, the user may identify whether the coffee is a cause of blood pressure increase, and may also identify how much time passes to increase a blood pressure after the user drinks coffee if the coffee is the cause of blood pressure increase.

Meanwhile, the user may determine that blood pressure increase caused by exercise is quite natural and thus does not need to be added to the condition. In this way, there may be data, which may be disregarded by the user, in the second data. In this case, the controller 120 may exclude data set by the user so as not to be added to the condition among the second data from the condition modification mode. Referring to FIG. 9, it is noted that the user performs an input for disregarding data related to 'dumbbell' among the second data.

Figure 10:
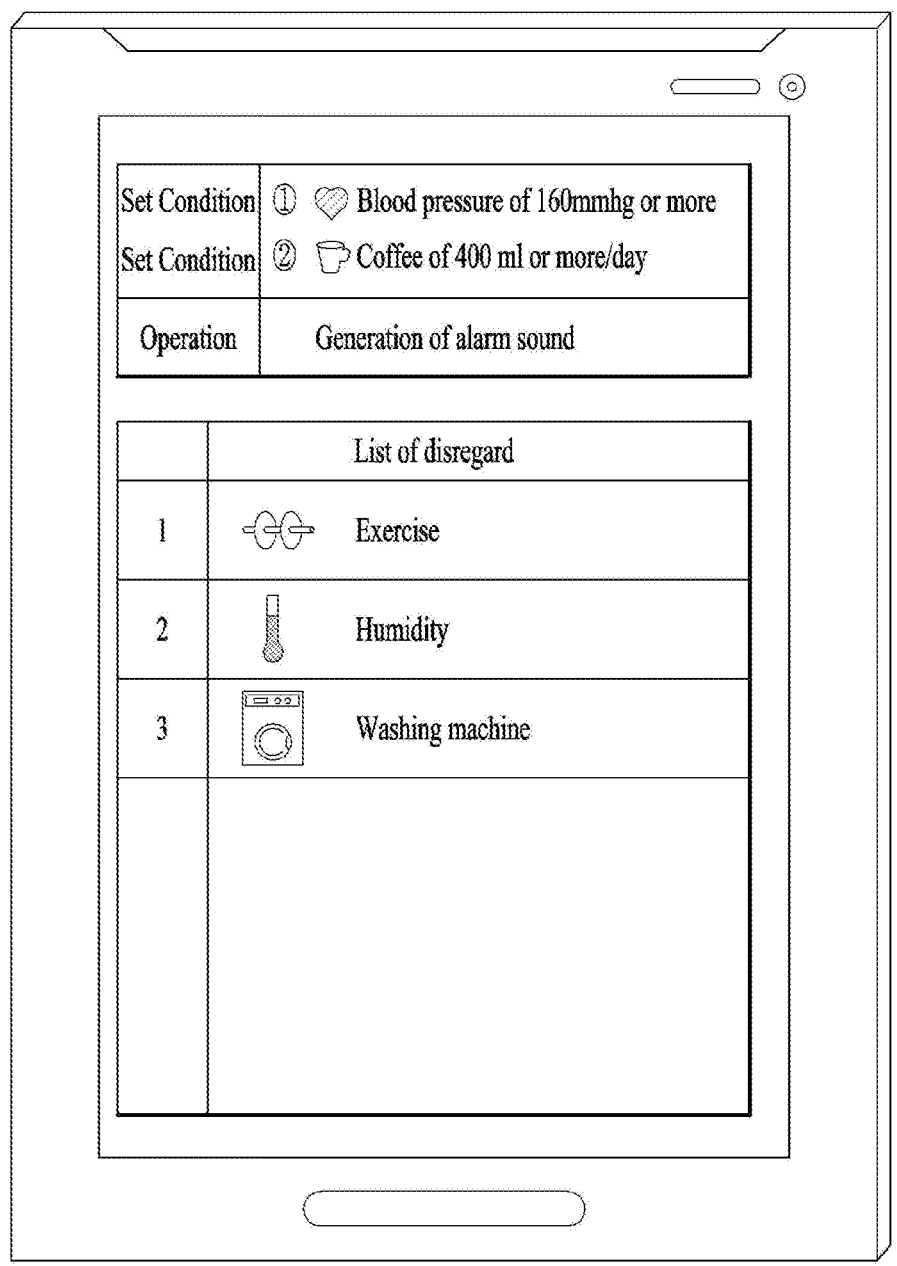

According to one embodiment of the present specification, if the management device 100 includes the display module 140, the controller 120 may output the control signal to display a list of data set so as not to be added to the condition when the user's input for allowing the data not to be added to the condition among the second data is received in the condition modification mode. Referring to FIG. 10, it is noted that a list of data set so as not to be added to the condition is displayed.

Hereinafter, a method for controlling an IoT management device according to the present specification will be described. Since the respective components and their roles of the management device 100 have been already described in detail, their repeated description will be omitted.

Figure 11:
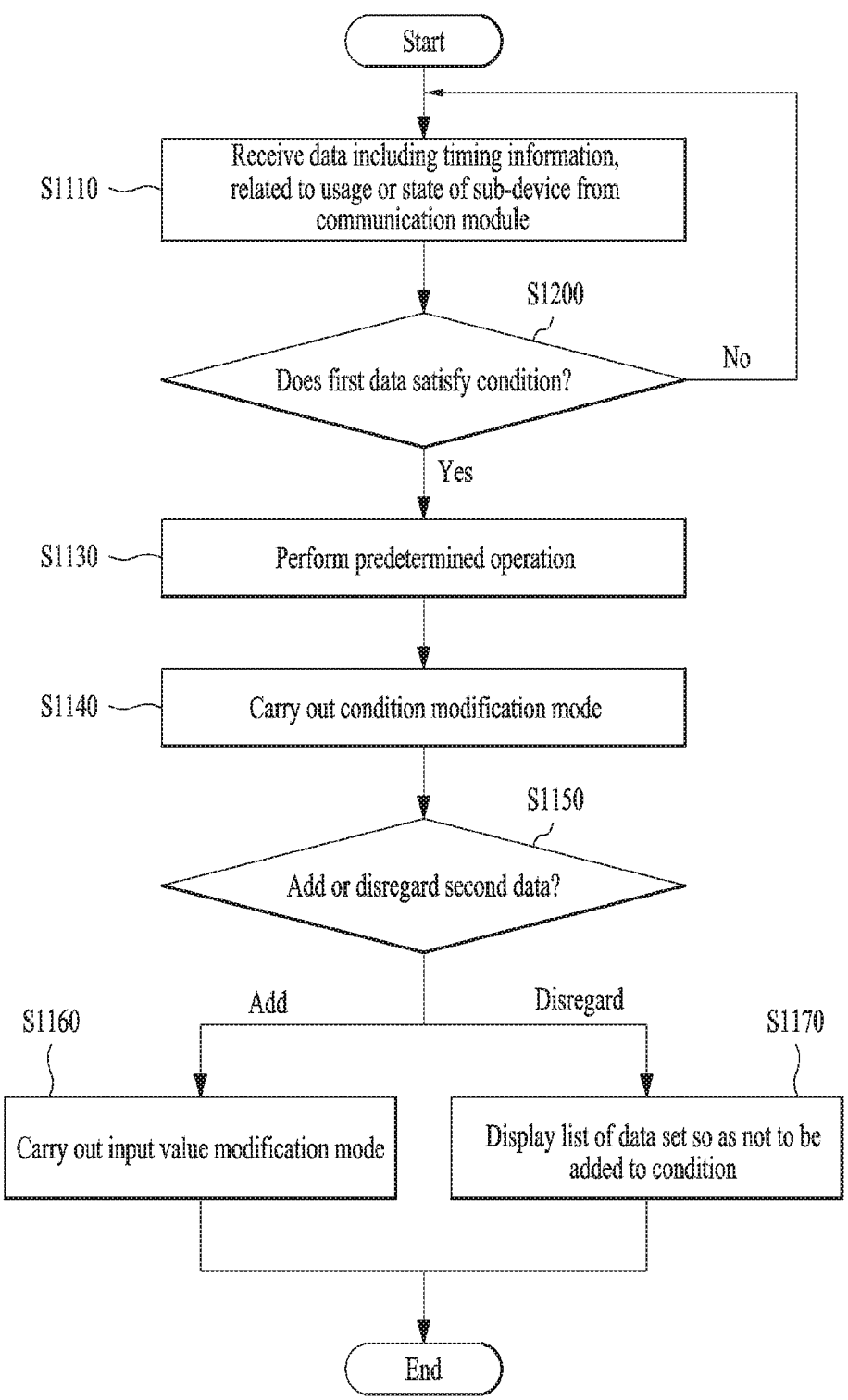
FIG. 11 is a flow chart briefly illustrating a method for controlling an IoT management device according to one embodiment of the present specification.

FIG. 11 is a flow chart briefly illustrating a method for controlling an IoT management device according to one embodiment of the present specification.

Referring to FIG. 11, first of all, in step S1110, the controller 120 receives data including timing information, related to usage or state of at least one sub-device from the communication module 110, which transmits and receives data to and from the sub-device connected to the communication network. The controller 120 advances to step S1200 after completing the process of the step S1110.

In step S1200, the controller 120 determines whether data (hereinafter, referred to as 'first data') associated with a predetermined condition among the data satisfies the condition. If the first data does not satisfy the condition ('no' of step S1200), the controller 120 advances to step S1110. Therefore, the controller 120 repeatedly executes the steps S1110 and S1200. On the other hand, if the first data satisfies the condition ('yes' of step S1200), the controller 120 advances to step S1130.

In step S1130, the controller 120 executes a predetermined operation. The controller 120 advances to step S1140 after completing the process of the step S1130.

In step S1140, the controller 120 executes a condition modification mode. The condition modification mode is a mode for asking a user whether to modify the condition to a condition to which data (hereinafter, referred to as 'second data') not associated with the condition among data having time information prior to the condition satisfying time is added. The condition modification mode has been described in detail with reference to FIGS. 6 to 10. In accordance with the embodiment of the present invention, the second data may be selected in the condition modification mode. Among the second data, data close to the condition satisfaction timing, data having time information from the previous condition satisfaction timing to the last condition satisfaction timing, highly frequent data, or data of the sub-device which is added to the communication network most recently may be selected. Meanwhile, the controller 120 advances to step S1150 after completing the process of the step S1140.

In step S1150, the controller 120 determines whether the user's input is 'add' or 'disregard' of the second data. If the user's input is 'add' of the second data ('add' of step S1150), the controller 120 advances to step S1160. On the other hand, if the user's input is 'disregard' of the second data ('disregard' of step S1150), the controller 120 advances to step S1170.

In step S1160, the controller 120 executes an input value modification mode. Since the input value modification mode has been described with reference to FIG. 8, its repeated description will be omitted.

Meanwhile, in step S1170, the controller 120 may display a list of data, which is set so as not to be added to the condition, on the display module 140. Since the list has been described with reference to FIG. 1, its repeated description will be omitted.

The controller 120 ends by completing the process of the step S1160 or S1170. In this specification, end does not mean that all activities of the controller 120 end.

Although the terms used in this specification are selected from generally known and used terms considering their functions in the present specification, the terms may be modified depending on intention of a person skilled in the art, practices, or the advent of new technology. Also, in special case, the terms mentioned in the description of the present specification may be selected by the applicant at his or her discretion, the detailed meanings of which are described in relevant parts of the description herein. Accordingly, the terms used herein should be understood not simply by the actual terms used but by the meaning lying within and the description disclosed herein.

Specific structural or functional descriptions in the embodiments disclosed in this specification are intended to describe the embodiments, and the embodiments can be carried out in various forms and it should not be understood that the scope of the invention is limited by the embodiments described in this specification.

Since the embodiments according to the present specification may be carried out in other specific ways and various modifications may be made in the embodiments, specific embodiments will be illustrated in the drawings and will be described in detail in this specification. However, this is not intended to limit the embodiments according to the present specification to a specific disclosed type, and it is to be understood that the embodiments according to the present specification include all changes, equivalents, or replacements included in spirits and technical scope of the present specification.

Although the terms such as "first" and/or "second" in this specification may be used to describe various elements, it is to be understood that the elements are not limited by such terms. The terms may be used to identify one element from another element. For example, the first element may be referred to as the second element, and vice versa within the range that does not depart from the scope of the present specification.

In the specification, when a part "comprises" or "includes" an element, it means that the part further comprises or includes another element unless otherwise mentioned. Also, the term " . . . module" disclosed in the specification means a unit for processing at least one function or operation, and may be implemented by hardware, software or combination of hardware and software.

Although the present specification has been described through the detailed embodiments, it will be apparent to those skilled in the art that the present specification can be embodied in other specific forms without departing from the spirit and essential characteristics of the specification. The scope of the specification should be determined by reasonable interpretation of the appended claims and all change which comes within the equivalent scope of the specification are included in the scope of the specification.

Also, although one dependent component is added for convenience of understanding in the description of the embodiments of the present specification, two or more dependent components may be added in the embodiments of the present specification. Thus, the scope of the present specification is not limited by the embodiment disclosed in this specification.

MODE FOR CARRYING OUT THE INVENTION

Various embodiments have been described in the best mode for carrying out the present specification. It will be apparent to those skilled in the art that the present specification can be embodied in other specific forms without departing from the spirit and essential characteristics of the specification. Thus, the scope of the specification should be determined by reasonable interpretation of the appended claims and all change which comes within the equivalent scope of the specification are included in the scope of the specification.

INDUSTRIAL APPLICABILITY

The present specification may fully or partially be applied to electronic devices.

The invention claimed is:

1. An Internet of Things (IoT) management device comprising:
a communication module configured to transmit and receive data to and from a plurality of sub-IoT devices (hereinafter, referred to as "sub-devices") connected to a communication network;
a display; and
a controller configured to:
  receive, from the communication module, data including time information and related to usage or state of the sub-devices, the received data including first data received from a first sub-device, second data received from a second sub-device, and third data received from a third sub-device;
  perform a predetermined operation when the first data related to usage or state of a first sub-device satisfies a predetermined condition;
  execute a condition modification mode to modify the predetermined condition to a modified condition by adding or excluding additional data among the received data to or from the predetermined condition,
  wherein the additional data is not associated with the predetermined condition and has time information prior to a condition satisfaction timing which is a timing when the predetermined condition is satisfied;
  cause the display to display, in the condition modification mode, an interface for modification of the predetermined condition, the interface including the predetermined condition associated with the first data, the predetermined operation associated with the first data, and the additional data not associated with the predetermined condition, the additional data including the second data related usage or state of the second sub-device and the third data related to usage or state of the third sub-device;

cause the display to firstly display data generated from a sub-device lastly added to the communication network when the additional data is displayed in the interface;

cause the display to display the modified condition including the first data and the second data when the predetermined condition is modified to the modified condition in response to a first input for adding the second data to the predetermined condition received via the interface for modification of the predetermined condition;

exclude the third data from the modified condition in response to a second input for disregarding the third data received via the interface for modification of the predetermined condition;

cause the display to display a list of excluded data not to be added to the modified condition, the list including the third data;

execute an input value modification mode for asking a user whether to modify a value of the second data, which will be added to the modified condition when the predetermined condition is modified to the modified condition, in response to an input received from the user; and cause the display to display an interface for modifying the added value of the second data in response to receiving the user's input for modifying the value of the second data in the input value modification mode such that a modified value of the second data is added to the modified condition in response to the user's input.

2. The IoT management device according to claim 1, wherein the controller is further configured to execute the condition modification mode by using the additional data having the time information that is within a predetermined time range before and after the condition satisfaction timing.

3. The IoT management device according to claim 1, wherein, when the condition satisfaction timing is a condition satisfaction timing of N times (N is a natural number of 2 or more) and a condition satisfaction timing occurring just before the condition satisfaction timing of N times is a condition satisfaction timing of N−1 times, the controller is further configured to execute the condition modification mode by using data having time information between the condition satisfaction timing of N−1 times and the condition satisfaction timing of N times among the second data.

4. The IoT management device according to claim 1, wherein the controller is further configured to execute the condition modification mode by using the additional data received from the communication module over a predetermined frequency.

5. The IoT management device according to claim 1, wherein the controller is further configured to execute the condition modification mode by using the data generated from the sub-device, which is added to the communication network lastly, among the additional data.

6. The IoT management device according to claim 5, further comprising a memory configured to store a list of sub-devices connected to the communication network, the list of sub-devices including the first, second, and third sub-devices, wherein the controller is further configured to determine the sub-device, which is added to the communication network lastly, by using the list of sub-devices stored in the memory.

7. The IoT management device according to claim 1, wherein the controller is further configured to:
request the sub-devices to transmit the additional data through the communication module at the condition satisfaction timing; and
execute the condition modification mode by receiving the additional data from the communication module.

8. The IoT management device according to claim 1, further comprising a memory configured to store the data received through the communication module, wherein the controller is further configured to execute the condition modification mode by selecting the second data from the data stored in the memory at the condition satisfaction timing.

9. The IoT management device according to claim 1, wherein the controller is further configured to cause the display to firstly display data having timing information corresponding to a predetermined time range before and after the predetermined condition is satisfied, when displaying the second data.

10. The IoT management device according to claim 1, wherein the controller is further configured to cause the display to firstly display highly frequent data among the additional data when displaying the additional data along with the interface for modification of the predetermined condition and the predetermined condition associated with the first condition.

11. The IoT management device according to claim 1, wherein, when the first input is received, the controller is further configured to cause the display to display an interface for modification of a value of the second data.

12. The IoT management device according to claim 1, wherein, when the second input is received, the controller is further configured to cause the display to display the list of excluded data including the third data.

13. The IoT management device according to claim 1, wherein the controller is further configured to cause a sub-device, which includes a display, among the sub-devices, to display a screen related to the condition modification mode.

14. A method for controlling an Internet of Things (IoT) management device, the method comprising:
receiving data including time information and related to usage or state of a plurality of sub IoT devices (hereinafter, referred to as 'sub-devices') connected to a communication network, from a communication module for transmitting and receiving data to and from the plurality of sub-devices, the received data including first data received from a first sub-device, second data received from a second sub-device, and third data received from a third sub-device;
determining whether the first data related to usage or state of a first sub-device satisfies a predetermined condition;
performing a predetermined operation when the first data satisfies the predetermined condition;
executing a condition modification mode to modify the predetermined condition to a modified condition by adding or excluding additional data among the received data to or from the predetermined condition,
wherein the additional data is not associated with the predetermined condition and has time information prior to a condition satisfaction timing which is a timing when the predetermined condition is satisfied;

displaying, in the condition modification mode, an interface for modification of the predetermined condition on a display, the interface including the predetermined condition associated with the first data, the predetermined operation associated with the first data, and the additional data not associated with the predetermined condition, the additional data including the second data related usage or state of the second sub-device and the third data related to usage or state of the third sub-device;

firstly displaying data generated from a sub-device lastly added to the communication network when the additional data is displayed;

displaying the modified condition including the first data and the second data when the predetermined condition is modified to the modified condition in response to a first input for adding the second data to the predetermined condition received via the interface for modification of the predetermined condition;

excluding the third data from the modified condition in response to a second input for disregarding the third data received via the interface for modification of the predetermined condition;

displaying a list of excluded data not to be added to the modified condition, the list including the third data;

executing an input value modification mode for asking a user whether to modify a value of the second data, which will be added to the modified condition when the predetermined condition is modified to the modified condition, in response to an input received from the user; and displaying an interface for modifying the added value of the second data in response to receiving the user's input for modifying the value of the second data in the input value modification mode such that a modified value of the second data is added to the modified condition in response to the user's input.

15. The method according to claim 14, wherein the predetermined operation is performed at the condition satisfaction timing.

16. The method according to claim 14, further comprising displaying an interface for modification of a value of the second data when the first input is received.

17. The method according to claim 14, further comprising displaying the list of excluded data including the third data when the second input is received.

18. The method according to claim 14, wherein the predetermined operation comprises generating an alarm sound.

* * * * *